United States Patent [19]
Goble

[11] Patent Number: 5,954,995
[45] Date of Patent: *Sep. 21, 1999

[54] DROP-IN SUBSTITUTES FOR 1,1,1,2-TETRAFLUOROETHANE (R-134A) REFRIGERANT

[76] Inventor: George H. Goble, 286 W. Navajo, West Lafayette, Ind. 47906

[ * ] Notice: This patent issued on a continued prosecution application filed under 37 CFR 1.53(d), and is subject to the twenty year patent term provisions of 35 U.S.C. 154(a)(2).

[21] Appl. No.: 08/820,843

[22] Filed: Mar. 20, 1997

Related U.S. Application Data

[60] Provisional application No. 60/013,946, Mar. 22, 1996.

[51] Int. Cl.$^6$ .................................................... C09K 5/04
[52] U.S. Cl. .............................................. 252/67; 62/114
[58] Field of Search ................................. 252/67; 62/114

[56] References Cited

FOREIGN PATENT DOCUMENTS

| | | |
|---|---|---|
| 0451692 | 10/1991 | European Pat. Off. . |
| 3-93890 | 4/1991 | Japan . |
| 93/05105 PCT/US93/ | 3/1993 | WIPO . |
| 06043 | 12/1993 | WIPO . |
| 94/00529 | 1/1994 | WIPO . |
| 94/17153 | 8/1994 | WIPO . |

*Primary Examiner*—Christine Skane
*Attorney, Agent, or Firm*—Clifford W. Browning; Woodard, Emhardt, Naughton, Moriarty & McNett, Patent and Trademark Attorneys

[57] ABSTRACT

A group of refrigerant fluids that may be combined in novel ways to produce several excellent "drop-in" substitutes for R-134a refrigerant. Performance is increased by constructing a zeotropic mixture of refrigerants, such that a single boiling point (of R-134a) is replaced by a "temperature glide" between the mixture's "bubble point" and "dew point". The temperature glide causes the phase change area in the condenser to be larger than with a single component refrigerant such as R-134a, thereby increasing heat rejection of the condenser, which lowers head pressures, and increases capacities and efficiencies compared to R-134a. Components are also selected to attempt to reduce the overall critical temperature of the mixture of refrigerants, also increasing performance and lowering head pressures under hot conditions with undersized condensers. Finally, a small amount of a mineral oil miscibility improver may be added, not to return mineral oil from the evaporator as in R-12 systems, but to keep waxes, tars, and other contaminates in the system that may have arisen from the manufacturing process (such as wax coatings on the motor windings in a hermetic compressor, or "tar" from valve packing) soluble.

7 Claims, 8 Drawing Sheets

DROP-IN SUBSTITUTES FOR 1,1,1,2-TETRAFLUOROETHANE (R-134A) REFRIGERANT

The present application claims the benefit under Title 35, U.S.C. §119(e) of U.S. provisional application Ser. No. 60/013,946, filed Mar. 22, 1996.

The present invention relates to refrigerants generally, and more specifically to a mixture of refrigerants that may be substituted for 1,1,1,2-tetrafluoroethane (R-134a) refrigerant.

BACKGROUND OF THE INVENTION

In order to provide a more compact format for identifying mixtures of refrigerants in the following discussions, mixtures of refrigerants will be listed in the form of:

R-ABC/DEF/GHI N0/N1/N2 which represents a mixture of refrigerants (fluids) R-ABC, R-DEF, and R-GHI where N0, N1, and N2 are the weight percentages of each component refrigerant fluid, and N0+N1+N2=100 percent; or in the form of:

R-ABC/DEF/GHI N0—N0'/N1—N1'/N2—N2' which is similar, but specifies ranges of the weight percentages each of the component refrigerant fluids, with the total of the weight percentages being 100 percent.

Zeotropic (nonazeotropic) mixtures of refrigerants will change composition if they are allowed to leak as vapor phase from a container containing all components of the refrigerant mixture in both vapor and liquid phases. Single component and azeotropic mixtures of refrigerants do not change composition appreciably from vapor leakage. Single component and azeotropic mixtures of refrigerants have only one boiling point temperature for a given pressure, provided the refrigerant exists as both liquid and vapor states in the container. Zeotropic mixtures of refrigerants will boil over a range of temperatures at a given pressure. As the temperature is raised, the point at which the first bubbles appear (constant pressure) in the liquid is known as the "bubble point," which is roughly analogous to the boiling point of a single component or an azeotropic mixture. Starting in a vapor phase and lowering the temperature (at a constant pressure) to the point where the first droplet of liquid forms defines what is known as the "dew point" of the mixture of refrigerants. The difference between the bubble point temperature and the dew point temperature is known as the temperature "glide". A pressure gauge connected to a cylinder containing a zeotropic mixture of refrigerants will read the bubble point pressure for the corresponding temperature of the refrigerant mixture.

Under the Montreal Protocol, as amended, United States laws (1990 Clean Air Act), and U.S. Environmental Protection Agency rules, the production and importing of dichlorodifluoromethane (CFC-12 or R-12) refrigerant ended on Dec. 31, 1995. Additionally, only 15% of the 1989 baseline amounts of chlorinated fluorocarbons (CFCs) was allowed to be produced or imported into the U.S. during the year 1995, adjusted on an ozone depletion factor basis. R-12 was the major share of that production.

With the effective date of the ban on U.S. R-12 production and importing having passed (Dec. 31, 1995), one industry option has been to retrofit R-12 refrigeration or air conditioning systems, both stationary and automotive, to R-134a (tetrafluoroethane). The mineral oils used in R-12 systems are completely immiscible in R-134a. The industry has therefore developed new oils, which are either polyalkylene glycol (PAG) based (for automotive) or polyol ester (POE) based (stationary refrigeration and some automotive retrofit).

While PAG oils are good lubricants, and are miscible in R-134a at typical evaporator temperatures, they have two main problems. First, most PAG oils cannot tolerate even minute traces of residual chlorides that remain in the R-12 refrigeration or air conditioning systems that have been purged of R-12. These chlorides are dissolved in the small amount of mineral oils which cannot be flushed out or are in coatings on the inside of aluminum piping (aluminum chloride from previous R-12) or are dissolved in rubber hoses. The presence of chlorides greatly accelerates the breakdown of most PAG oils.

It has been reported in the literature that test systems that were flushed with R-11 (trichlorofluoromethane) and then retrofitted to PAG oil and R-134a, sustained catastrophic compressor failures within one week due to oil breakdown. R-11 has a greater affect on PAG oil breakdown than does R-12. It was common practice in the automotive air conditioning service industry, into the early 1990s, to flush R-12 systems with R-11 to remove contaminates. The traces of R-11 remaining do not interfere with R-12 operation, but could cause premature failures if R-12 systems are ever retrofitted to R-134a and PAG oils.

Compressors manufactured for R-12 and mineral oil use were often constructed with a paraffin based wax coating on the motor windings as an aid to building the motor without breaking the wire during the motor winding phase of the construction. When retrofitted to R-134a and POE oils, the paraffin would sometimes come off the windings, and not dissolve in the R-134a refrigerant and POE oils, and circulate through the system as solids and plug up the refrigerant metering device, usually a capillary tube, causing the system to fail. R-12 (or a substitute with adequate mineral oil miscibility) and mineral oil just dissolve the pieces of paraffin wax that come off the motor windings and therefore do not clog the refrigerant metering device.

Finally, the low critical temperature of R-134a (214.07 degrees Fahrenheit) verses the critical temperature of R-12 (233.26 degrees Fahrenheit) can cause abnormally high head pressures in hot ambient conditions in systems designed for R-12. For automotive applications, stopped traffic or hot climates can cause a reduction in R-134a performance. Systems designed for R-134a often increase the size of the condenser about 50 percent over the size similarly designed R-12 system condenser. Stationary systems, such as vending machines, now retrofitted to R-134a, may see high head pressure and low performance problems when the condenser becomes slightly fouled by dirt and dust. R-12 systems can run much longer between cleanings to remove dust and dirt from the condenser than similar systems converted to R-134a.

R-406A is a known ternary mixture of refrigerants, consisting of isobutane (R-600a), chlorodifluoroethane (R-142b), and chlorodifluoromethane (R-22), that provides a "drop-in" substitute for dichlorodifluoromethane (R-12) refrigerant. R-406A is described in U.S. Pat. Nos. 5,151,207 and 5,214,929, the disclosures of which are incorporated herein by reference.

If one must convert an existing R-12 refrigeration or air conditioning system to another refrigerant due to the Montreal Protocol mandated phaseout of R-12 refrigerant, it is usually far preferable to use a refrigerant mixture with adequate miscibility with mineral oils used by R-12 systems, such as R-406A (R-600a/142b/22 4/41/55) or GHG-X4

(R-600a/124/142b/22 4/28.5/16.5/51) than to attempt to retrofit to R-134a. However, one may have followed the industry recommended choice and already retrofitted said systems to R-134a or purchased a new system that was manufactured for R-134a refrigerant, using lubricants that are miscible with R-134a such as POE or PAG oils.

To date, the oils used in new or retrofitted R-134a refrigeration and air conditioning systems (PAG and some POE) are adversely affected by chlorinated refrigerants (HCFCs), with the PAG oils being affected more than the POE oils. Once installed in a refrigeration or air conditioning system, PAG or POE oils are virtually impossible to completely remove from a system, especially from the compressor. If said systems where then recharged with chlorine containing refrigerants, such as R-406A or GHG-X4 and R-12 compatible mineral oils, some amount of the PAG or POE oils would remain and would be destroyed, creating contamination and system failures. A better performing refrigerant is needed that can be "drop-in" substituted for R-134a in R-134a refrigeration and air conditioning systems, and that is also compatible with oils used by R-134a refrigeration and air conditioning systems.

There are a few existing refrigerants that can be "drop-in" substituted for R-134a in R-134a refrigeration and airconditioning systems, such as OZ-12, HC-12a, and ES-12r. However, these mixtures are composed entirely of hydrocarbons (typically R-600a/290 40/60) and are extremely flammable. Hydocarbon mixtures are outlawed in many states and by US EPA as "unacceptable" for use as a replacement for R-12 in all but a few specialized uses. These hydrocarbon refrigerants contain no chlorinated compounds, so they do not destroy oils used in R-134a systems.

SUMMARY OF THE INVENTION

In summary, I have discovered a group of refrigerant fluids, which are listed in Table 1, that may be combined in novel ways to produce several excellent "drop-in" substitutes for R-134a refrigerant. Performance is increased by constructing a zeotropic mixture of refrigerants, such that a single boiling point (of R-134a) is replaced by a "temperature glide" between the mixture's "bubble point" and "dew point". The temperature glide causes the phase change area in the condenser to be larger than with a single component refrigerant such as R-134a, thereby increasing heat rejection of the condenser, which lowers head pressures, and increases capacities and efficiencies compared to R-134a. Components are also selected to attempt to reduce the overall critical temperature of the mixture of refrigerants, also increasing performance and lowering head pressures under hot conditions with undersized condensers. Finally, a small amount of a mineral oil miscibility improver may be added, not to return mineral oil from the evaporator as in R-12 systems, but to keep waxes, tars, and other contaminates in the system that may have arisen from the manufacturing process (such as wax coatings on the motor windings in a hermetic compressor, or "tar" from valve packing) soluble. In R-12 mineral oil systems, these contaminates readily dissolve in mineral oils, causing no problems. In R-134a systems, the waxes and tars may not be soluble in POE or PAG oils and may turn into solids, and plug up the refrigerant metering device. The addition of a very small amount of a mineral oil miscibility improver prevents these contaminates from becoming solid and plugging the system.

One embodiment of the present invention is the creation of "drop-in" substitutes for R-134a from novel mixtures of components from Table 1.

It is also an object of the present invention to provide a "drop-in" refrigerant substitute for R-134a that provides an acceptable level of cooling in low, medium, and high temperature applications where R-134a is now in use.

It is also an object of the present invention to provide a "drop-in" refrigerant substitute for R-134a that keeps a small amount of system contaminates, such as tars and waxes, soluble in the refrigerant/lubricant mixture, so said contaminates do not plug small openings, such as refrigerant metering devices It is also an object of the present invention to provide a "drop-in" substitute refrigerant for R-134a that causes very little global warming damage.

It is also an object of the present invention to provide a "drop-in" substitute refrigerant for R-134a that causes zero stratospheric ozone damage.

DESCRIPTION OF THE PREFERRED EMBODIMENTS

Figure 1:
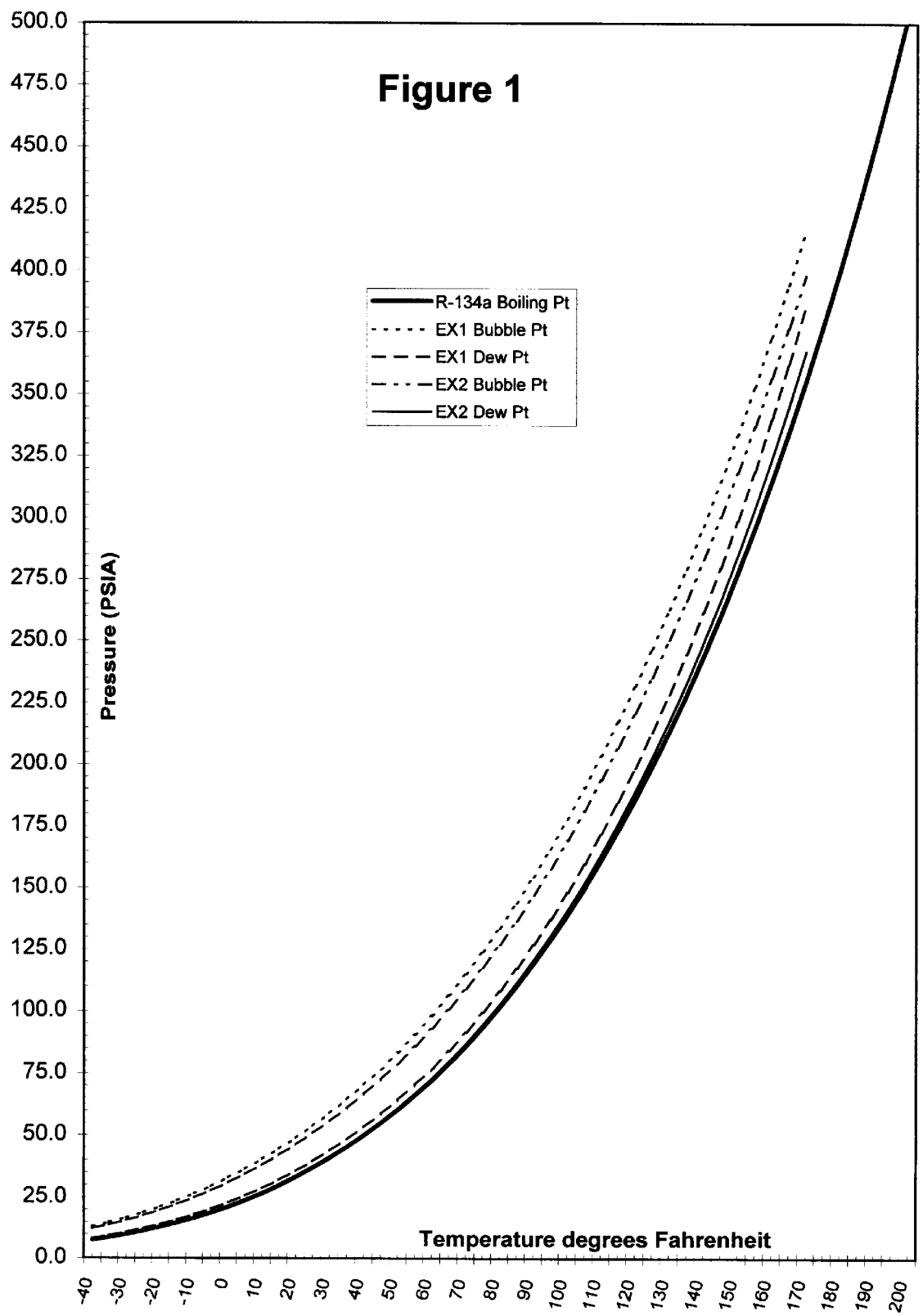

For the purposes of promoting an understanding of the principles of the invention, reference will now be made to the embodiments described below and specific language will be used to describe the same. It will neverless be understood that no limitation of the scope of the invention is thereby intended, such alterations and further modifications in the described embodiments, and such further applications of the principles of the invention as described therein being contemplated as would normally occur to one skilled in the art to which this invention relates.

Boiling points (BP), and critical temperatures (Crit) in Table 1 are in degrees Fahrenheit and are taken from the November 1993 "NIST Database 23: NIST REFPROP v4.0", available from U.S. Department of Commerce, Technology Administration, National Institute of Standards and Technology (NIST), Standard Reference Data Program, Gaithersburg Md. 20899, and the "January 1996 ARTI Refrigerant Database", available from Engineering Consultant, 10887 Woodleaf Lane, Great Falls Va. 22066-3003. Molecular weights (MW) are taken from the same sources.

TABLE 1

| R-num | Formula | Name | BP | Crit | MW |
|---|---|---|---|---|---|
| R-227ea | CF3CHFCF3 | 1,1,1,2,3,3,3-heptafluoropropane* | 2.5 | 215.37 | 170.0 |
| R-134a | CF3-CH2F | 1,1,1,2-tetrafluoroethane | −15.07 | 214.07 | 102.0 |
| R-143a | CF3-CH3 | 1,1,1-trifluoroethane | −53.23 | 163.58 | 84.04 |
| R-125 | C2HF5 | pentafluoroethane | −55.43 | 151.12 | 120.0 |
| R-E125 | CFH2-O-CF3 | difluoromethyltrifluoromethyl ether | −41.9 | 176.7 | 136.0 |
| R-E143a | CH3-O-CF3 | methyl trifluoromethyl ether | −10.8 | 220.8 | 100.04 |
| R- | CHF2-CF2-O- | 1-(trifluoromethoxy)- | 26.3 | 186.0 | 238.3 |

TABLE 1-continued

| R-num | Formula | Name | BP | Crit | MW |
|---|---|---|---|---|---|
| E227ca2 | CF3 | 1,1,2,2-tetrafluoroethane | | | |
| R-245cb | CH3-CF2-CF3 | 1,1,1,2,2-pentafluoropropane | 0.3 | 224.5 | 134.0 |
| R-600a | C(CH3)3 | isobutane | 10.83 | 274.46 | 58.12 |
| R-290 | C3H8 | propane | −43.75 | 206.06 | 44.10 |
| R-E170 | CH3-O-CH3 | dimethyl ether(DME) | −12.7 | 263.8 | 46.07 |
| R-1270 | CH3CH = CH2 | propylene | −53.8 | 198.4 | 42.07 |
| R-1216 | CF2 = CFCF3 | hexafluoropropene | −20.2 | unknown | 150.0 |
| R-218 | C3F8 | perfluoropropane | −34.15 | 161.4 | 188.0 |
| R-C318 | C4F8 | octafluorocyclobutane | 19.42 | 239.6 | 200.4 |
| R-C270 | C3H6 | cyclopropane | −27.2 | 256.3 | 42.1 |
| R-152a | CH3CHF2 | 1,1-difluoroethane | −12.37 | 236.39 | 66.05 |
| R-600 | C4H10 | n-butane | 31.03 | 305.62 | 58.12 |
| R-32 | CH2F2 | difluoromethane | −61.15 | 172.78 | 52.02 |
| R-134 | CHF2CHF2 | 1,1,2,2-tetrafluoroethane | −3.66 | 246.11 | 102.03 |
| R-116 | CF3CF3 | hexafluoroethane | −108.7 | 67.8 | 138.012 |
| R-23 | HCF3 | trifluoromethane | −115.65 | 78.71 | 70.01 |
| R-7146 | 8F6 | sulfur hexafluoride | −82.8 | 114.0 | 146.054 |
| R-CE216 | -CF2-CF2-O-CF2- | hexafluoro-oxetane | −20.4 | 191.1 | 166.022 |
| R-C216 | -CF2-CF2-CF2- | hexafluorocyclopropane | −24.7 | unknown | 150.023 |
| R-CE216ca1 | -CF2-O-CF2-O-CF2- | hexafluorodioxetane | −7.8 | 194.0 | 182.022 |
| R-E218 | CF3-CF2-O-CF3 | 1-(trifluoromethoxy)-1,1,2,2,2-pentafluoroethane | unknown | unknown | 204.02 |
| R-E218ca12 | CF3-O-CF2-O-CF3 | bis(trifluoromethoxy)-difluoromethane | unknown | unknown | 220.019 |

*At the present time, only the 1,1,1,2,3,3,3-heptafluoropropane isomer is available in commercial quantities, however, all isomers of heptafluoropropane are within the scope of the present invention.

The refrigerant fluids in Table 1 may be grouped into four categories, GROUP-A, GROUP-B, GROUP-C, and GROUP-D as set forth in Table 2. GROUP-A contains refrigerant fluids with the higher boiling points, GROUP-B contains refrigerant fluids that improve oil miscibility with mineral oils, tars and waxes. GROUP-C contains refrigerant fluids with the lowest boiling points. GROUP-D refrigerant fluids may be used to dilute the other three groups. Some refrigerant fluids (e.g. R-143a) may be in more than one GROUP. Flammability is listed as "very" for very flammable refrigerant fluids, "weak" for weakly or mildly flammable refrigerant fluids and "none" for nonflammable refrigerant fluids. The term "unkn" means "unknown".

TABLE 2

| GROUP-A | |
|---|---|
| Refrig | Flam |
| R-227ea | none |
| R-152a | weak |
| R-E218ca12 | none |
| R-E143a | unkn |
| R-E227ca2 | none |
| R-245cb | unkn |
| R-134 | none |
| R-C318 | none |
| R-CE216ca1 | none |
| R-E218 | none |

| GROUP-B | |
|---|---|
| Refrig | Flam |
| R-E134 | none |
| R-600a | very |
| R-290 | very |
| R-E143a | unkn |
| R-E170 | very |

TABLE 2-continued

| R-1270 | very |
|---|---|
| R-600 | very |
| R-C270 | very |

| GROUP-C | |
|---|---|
| Refrig | Flam |
| R-C216 | none |
| R-125 | none |
| R-143a | weak |
| R-E125 | none |
| R-218 | none |
| R-32 | weak |
| R-116 | none |
| R-23 | none |
| R-7146 | none |

| GROUP-D | |
|---|---|
| Refrig | Flam |
| R-134a | none |
| R-1216 | none |
| R-CE216 | none |

Preferred embodiments of the present invention include a mixture of refrigerant fluids with one or more components from GROUP-A, zero or more components from GROUP-B, one or more components from GROUP-C, and zero or more components from GROUP-D, subject to the three following conditions.

Condition 1

The resulting temperature versus pressure curve of a closed container containing said mixture of refrigerant fluids, such that all component refrigerant fluids coexist in both liquid and vapor states in the container, should approximate the temperature-pressure curve of a closed container of R-12 for the range of temperatures and pressures commonly used for R-134a refrigerant, about −40 degrees Fahrenheit to about 200 degrees Fahrenheit. The degree of approximation should be within about 15 percent to about 30 percent error. To account for the "glide" in the mixtures of refrigerant fluids, the "bubble point" pressure at a temperature of 70 degrees Fahrenheit should be around 10 percent higher than the pressure (gauge pressure, PSIG) of R-134a. Increasing the mass fraction of components from GROUP-C and decreasing the mass fraction of components from GROUP-A will cause the pressure versus temperature curve of the mixture of refrigerant fluids to increase and vice versa. Rarely, two or more refrigerant fluids may be combined and the resultant boiling/bubble point of the mixture may not lie in between the boiling points of the components. This is the result of a partial or complete azeotrope formation. If an azeotrope is formed, the resultant boiling/bubble point is often near or a few degrees lower than the component with the lowest boiling point. If an unwanted azeotrope forms, additional components can be added to further modify the temperature-pressure curve.

In order to achieve good performance, it is usually necessary to have roughly equal liquid volumes of low (GROUP-C) and higher boiling components (GROUP-A) in the final mixture. This results in better utilization of the evaporator and condenser surface areas.

If the object is to produce a "high performance" or "higher capacity" mixture of refrigerant fluids, which may only be usable under certain conditions, such as automotive air conditioning, where extra horsepower is available for compressor operation, or in low temperature situations where the compressor is under loaded, then the mass fraction of the components from GROUP-C may be further increased about 5 to about 20 weight percent. Conversely, to produce a "reduced capacity" mixture of refrigerant fluids, the mass fraction of GROUP-C components may be reduced by about 5 to about 15 weight percent. Reduced capacity refrigerant mixtures will often perform poorly (but still useable) in "normal" systems. Air conditioning systems which were oversized when installed, may use a reduced capacity refrigerant to obtain a better equipment load match to the heat load. Properly sized air conditioning systems provide far better humidity control (longer run times) than do oversized systems.

Condition 2.

Optionally, about 0.5 to about 2 weight percent of GROUP-B components may be added to the mixture to prevent system clogging from solidified waxes and tars that may be present in a refrigeration system, especially if said system had been retrofitted to R-134a refrigerant from R-12 refrigerant. There is no need to be miscibile with large amounts of mineral oils (as typically used in R-12 refrigeration systems), since the said systems will already contain oils which are miscibile with R-134a and probably HFCs (hydrofluorocarbons) in general.

Condition 3.

The resulting mixture of refrigerant fluids should be nonflammable or weakly flammable at worst. The maximum mass fraction of "very" flammable refrigerant fluid components will be limited to about 5 to about 10 percent. The maximum mass fraction of "weakly" flammable refrigerant fluid components will be limited to about 15 to about 60 percent. A test sample of the mixture of refrigerant fluids should be vapor leaked (fractionated) at several constant temperatures over the range of expected temperatures where the leaking may occur. Some temperatures for fractionation testing would typically be −20, 0, 40, 70, 120, 180 degrees Fahrenheit. Flammability tests should be conducted on the mass fractions of vapor and liquid phases and be analyzed with appropriate equipment (e.g. a gas chromatograph) at various points during each leak down to verify the mass fraction of flammable components does not become great enough to cause greater than "no" or "weak" flammability as desired. Flammability can also be reduced by placing the boiling point of a very or weakly flammable refrigerant fluid near a lesser flammable or nonflammable refrigerant fluid component with a similar boiling point. Total flammability may also be reduced by spreading out (by boiling point) the flammable components over the entire mixture instead of using just one flammable component.

For the purposes of making the mixture of refrigerants of the preferred embodiments of the present invention, one needs to procure the following equipment, or equivalents. A mixing cylinder, which can be a standard refrigeration industry "recovery" cylinder, or a small propane (20 pounds net weight propane) tank is needed. These are U.S. Department of Transportation (DOT) rated at 240 PSIG or higher. This tank (or cylinder) must be clean. Also needed is a refrigeration (or equivalent) vacuum pump, scales, and a refrigeration manifold set (hoses and gauges).

The air must be removed from the mixing cylinder with a vacuum pump, such as any used by refrigeration service technicians. A deep vacuum gauge is needed to verify that about a 200 micron vacuum is achieved on the mixing cylinder. Deep vacuum gauges that read to less than 25 microns are commonly available at refrigeration supply houses.

This mixing cylinder is placed on electronic charging scales, of the type commonly available to the refrigeration service technician. These scales often read in ½ ounce increments up to a total of 60 pounds or more total weight.

A refrigerant mixture is made by connecting up each component supply cylinder to the mixing cylinder on scales, and weighing in the appropriate weight percentage of each component. The mixing hoses or manifolds should be purged or evacuated first to remove air and moisture. Each component supply cylinder should have a "dip tube" or eductor tube to withdraw the component in liquid phase. If the supply component cylinder does not have a dip tube, it must be inverted to obtain the component in liquid phase.

Although the components can be mixed in any order, it is easier to add the high boiling components first. The vacuum on the cylinder will usually be sufficient to draw in the required amount of the first component.

Some sort of liquid pump will be required to transfer the remaining GROUP-A and GROUP-B components as the pressure on the mixing cylinder will rise to match the supply cylinder.

Instead of a liquid pump, the mixing cylinder may be chilled by any convenient means to 10–20 degrees Fahrenheit colder than the supply cylinders. Alternately, the component supply cylinder may be heated to 10–20 degrees Fahrenheit warmer than the mixing cylinder to facilitate the transfer. A hot water bath or cylinder heating blanket works nicely for this purpose.

When transferring GROUP-C components, no pump will be needed, as the higher pressures of GROUP-C components will (rapidly) transfer them to the mixing cylinder. Caution is advised, for after the relatively slow transfers for GROUP-A and GROUP-B components into the mixing cylinder, GROUP-C components will transfer very quickly, possibly surprising the person doing the mixing, and causing too much of a component to be transferred.

A refrigerant mixture, just completed, should be allowed to thermally stabilize for 12 hours or more before temperature and pressure measurements are taken, if needed. If static pressure and temperature measurements are not needed, a mixture may be charged into a refrigeration or air conditioning system and operated without the 12 hour or more delay. A refrigerant mixture should always be unloaded from the mixing cylinder in liquid phase when charging into an appliance or other refrigeration system. This prevents fractionation from changing the composition of the mixture during charging. The mixing cylinder may contain a "dip tube" to provide for unloading in liquid phase. If a mixing cylinder is used without a dip tube, the cylinder must be inverted to unload in liquid phase.

If a mixture contains significant mass fractions of components with high molecular mass, the molecular mass of the total refrigerant mixture will increase. This may be beneficial for operation in centrifugal chiller refrigeration systems.

The mixtures of refrigerants are zeotropic, which means the composition changes during evaporation and condensation phases of refrigeration or air conditioning system operation. Unlike a single component refrigerant, such as R-134a, zeotropic refrigerants do not evaporate or condense at a single temperature (for a given pressure), but they evaporate or condense over a small range or "glide" of temperatures. Depending on the temperature, the glides involved for the preferred embodiments of the present invention are in the order of 10 to 15 degrees Fahrenheit.

Some refrigeration systems should see performance improvements upwards of about 30 to about 40 percent due to the glide factor, especially during the initial cool down period. Other systems will exhibit similar performance to that of R-134a. Events taking place in the condenser are broken down into 3 rough areas. The hot gas upon entering the condenser is first desuperheated, no condensation takes place in this area, just a relatively low amount of heat is rejected in cooling the hot gas down to the point where it is ready to condense. The second area involves the actual condensation of the gas, where a phase change occurs to liquid state. A relatively high amount of heat is given off due to the phase change. Thirdly, the now liquid refrigerant is further cooled (called subcooling in the art), with a relatively low amount of heat rejected.

Zeotropic mixtures, such as those of the present invention, cause the condensation phase change area (and evaporation phase change area) to occupy more of the condenser (or evaporator), thus increasing the capacity of the condenser to reject or the evaporator to gain heat.

A stationary refrigeration system test stand was constructed from a conventional Copeland ¾ horsepower, medium temperature, R-134a condensing unit, model FTAM-A075-IAA-201. The condensing unit consisted of a Copeland model RS54C1E-IAA-100 compressor, a small fan, a condenser, and a liquid receiver. The compressor was rated for 11.8 Amperes, 115 volts, 60 Hertz power. The compressor came factory charged with Polyol Ester (POE) oil, suitable for R-134a operation. The high side liquid line was connected to a Sporlan refrigeration drier, model C-053 followed by a liquid line sight glass. A Sporlan model BFF A C 43 FC (½–1 ton) internally equalized expansion valve was used as the refrigerant metering device. The evaporator consisted of about 30 feet of ⅜ inch refrigeration copper wound into a coil of 20 turns of diameter about 5½ inches and about 11 ½ inches in height. The evaporator was connected back to the compressor via ⅜ inch tubing that contained an additional sight glass to monitor any liquid refrigerant that might be returning to the compressor.

The evaporator coil was aligned with it's axis vertical and immersed in a Rubbermaid two gallon insulated thermal jug, filled with about 1⅞ gallons (14.42 pounds) of distilled water. The test runs were all made under the same starting conditions: 75 degrees Fahrenheit condenser inlet air and the water was at 66 degrees Fahrenheit. The expansion valve was adjusted (visually) for about 0 degrees of suction line superheat (at the point of no liquid refrigerant returning to the compressor as monitored through the sight glass). R-134a was used as the baseline (control) refrigerant. Three degrees of condenser airflow restrictions were employed to simulate "dirt" buildup encountered in normal long term operation. The first degree was no airflow restriction, the second degree was about a 50% reduction in airflow accomplished by placing two pieces of porous ½ inch thick foam rubber over the air inlet side of the condenser. The third degree of reduction was achieved by taping cardboard to the air inlet side of the condenser, covering about ¾ (top) of it's area. The bottom ¼ was covered with the same foam as used to provide the second degree of restriction. About 90% of the airflow was blocked by the third degree of restriction. This is a highly abnormal condition (90% reduction) and probably will not occur often in practice. On the other hand, a 50% reduction in air flow could be expected to occur often in practice from dirt buildup. It was noted that the condenser on this R-134a condensing unit was sized about 50% larger than a condenser on the same capacity R-12 condensing unit. Thermocouples were attached to the compressor hot gas discharge line, and to the condenser liquid line out. Condenser outlet air, compressor current draw, and system low side and high side pressures were monitored at 1, 5, 10, 15, and 20 minutes after startup. At the 20 minute mark, the system was shut down, and the thermal jug on the evaporator was removed and weighed. Ice which was made during the run remained on the evaporator coils. The amount of ice made was determined by weighing the remaining water after each run.

The energy use was computed by doing a simple integration of the compressor amp draw. The average amp draw was used from each segment of the run to determine the energy use of that segment. For example, to compute the energy use for the first segment (minute 1 through minute 5), the amp draw at one minute was averaged with the amp draw at 5 minutes. The average amp draw was multiplied by 11 5 (volts) to obtain the average power for the segment and multiplied by the time used (in hours) to obtain the power (watt-hours) used for the segment. The energy used for a given run was the sum of the energy used in each of the four segments. Data (including amp draw) from minute 0 to minute 1 was ignored in each run, to allow the system to reach stability. The heat removed to cool down the 1.7 gallons of water from 66 degrees Fahrenheit to 32 degrees Fahrenheit, along with the evaporator coils, and the inside of the thermal jug is not accounted for in the amount of ice made, but it was the same for each run. Results are summarized in Table 3, below.

TABLE 3

| Refrigerant | ICE MADE (in pounds) | | |
| --- | --- | --- | --- |
| | NONE | PARTIAL | VERY |
| R-134a | 5.055 | 4.695 | 3.915 |
| Example 1 | 5.225 | 4.740 | 3.735 |
| Example 2 | 4.840 | | 4.385 |

TABLE 3-continued

|  | Total Watt-hours used | | |
| --- | --- | --- | --- |
| Refrigerant | NONE | PARTIAL | VERY |
| R-134a | 429.24 | 434.32 | 445.24 |
| Example 1 | 422.72 | 430.96 | 428.38 |
| Example 2 | 423.68 |  | 423.68 |

|  | Watt-hours/lb of ice | | |
| --- | --- | --- | --- |
| Refrigerant | NONE | PARTIAL | VERY |
| R-134a | 84.91 | 92.51 | 113.73 |
| Example 1 | 80.90 | 90.92 | 114.69 |
| Example 2 | 86.59 |  | 96.62 |

Each refrigerant was tested with the condenser unrestricted (labeled NONE), the condenser partially restricted for about a 50% reduction in airflow (labeled PARTIAL), and very restricted for about a 90% reduction in air flow (labeled VERY).

EXAMPLE 1

Three pounds of R-227ea/152a/125 55/5/40, a "drop-in" substitute refrigerant mixture for an R-134a stationary refrigeration system were created in the manner set forth above. Although the temperature-pressure curve is a little higher than optimal, it performed well when charged into the test stand described above. The higher than normal temperature-pressure curve resulted from the necessity of having roughly equal liquid volume portions of the low and high boiling components. The refrigerant mixture of this example produced 3.4% more ice than R-134a while using 1.5% less energy for the case of unrestricted condenser airflow. For the partially blocked condenser (about 50% airflow reduction), this mixture still made 1% more ice than R-134a while using 0.8% less energy.

For the highly obstructed condenser (about 90% airflow reduction) case, R-134a faired better. R-134a produced 4.8% more ice than the mixture of this example, but R-134a also used 3.9% more energy. The extremely obstructed condenser is not often encountered in the field, as the system would most likely have failed before this state was reached.

EXAMPLE 2

Three pounds of R-227ea/152a/125 60/5/35, a "drop-in" substitute refrigerant mixture for an R-134a stationary refrigeration system were created in the manner set forth above. Although the temperature-pressure curve is a little higher than optimal, but closer to R-134a than the mixture of Example 1, it only produced more ice than R-134a in the case of the highly obstructed condenser (producing 12% more ice and using 4.8% less energy). R-134a outperformed the mixture of this example when the condenser was unrestricted. R-134a made 4.4% more ice while using 1.3% more energy. This mixture would be useful for continuous operation in high ambient temperatures and/or heavy dirt fouling of the condenser airflow (or water flow if water cooled).

EXAMPLE 3

3.2 pounds of the mixture of Example 1, a "drop-in" substitute refrigerant mixture for an R-134a automotive air conditioning system were created in the manner set forth above. 2.9 pounds of this mixture were charged into 1982 Chevy pickup truck air conditioning system. This system, based on the GM "R4" compressor, was originally designed for R-12 refrigerant, and had been retrofitted to R-134a during the previous year. Retrofitting including replacing the condenser with a larger one, and adding a second outboard condenser fan to provide more condenser airflow and changing the oil from mineral oil to PAG oil. The R-134a retrofit had performed poorer cooling (truck is owned by a Lafayette, Ind., air conditioning service shop and the R-134a retrofit was a "test" retrofit) than did the original R-12, even after numerous attempts at "tweaking" it's performance on R-134a. When operated with the mixture of this example, (ambient temperature was 81 degrees Fahrenheit), excellent cooling performance was obtained, although the head pressure was a little higher than normal, but still well within system design limits. The air conditioner controls were set on "MAX" (highest fan speed, recirculate). The low pressure cutout switch was set at (the standard setting) of 24 PSIG. The second condenser fan, added during the R-134a retrofit, was disconnected for this example, creating a tougher test.

| Driving Conditions | Suction pressure (PSIG) | Head pressure (PSIG) | Duct Temperature (degrees Fahrenheit) |
| --- | --- | --- | --- |
| Not moving, engine idle | 55 | 235 | 52 |
| In town, 35 MPH | 32 | 220 | 42 |
| Highway, 55 MPH | 25 | 190 | 39 |
| Highway, 65 MPH | 24 | 175 | 38 |

The owner of the truck in this example stated that the cooling performance of the mixture of this example significantly exceeded the cooling performance of R-134a, and somewhat exceeded the cooling performance of the original R-12 system.

EXAMPLE 4

25 pounds of the mixture of Example 1, a "drop-in" substitute refrigerant mixture for an R-134a automotive air conditioning system, were created in the manner set forth above. A 199X Cadillac vehicle, that was manufactured with a R-134a air conditioning system, had the original R-134a charge removed and was evacuated and recharged with 2 pounds of the mixture of this example. Head pressures ran about 10% higher than with R-134a, suction pressures were the same. Cooling performance (82 degrees Fahrenheit) was superior to the cooling performance of the original R-134a. Duct temperatures (MAX Fan, recirculate) were about 5 degrees Fahrenheit colder at idle and 10 to 14 degrees colder when doing normal "in town" driving. This vehicle was taken to Florida (winter), and has been performing well for four months in 80 to 90 degree Fahrenheit ambient conditions.

EXAMPLE 5

3.2 pounds of R-227ea/152a/125 62/8/30, a "drop-in" substitute refrigerant mixture for an R-134a automotive air conditioning system were created in the manner set forth above. All of this mixture was charged into the air conditioning system of the vehicle in Example 3. Ambient temperature was 87 degrees Fahrenheit. While driving 55MPH, the charge was adjusted by admitting liquid refrigerant back into the (metered) charging cylinder. Optimum performance was obtained with a system charge of 2.9 pounds. Performance similar to R-12 was obtained. Highway driving (55 MPH) produced duct temperatures of 42 degrees Fahrenheit on MAX fan speed (recirculate), and 39 degrees Fahrenheit on one fan speed slower. The head pressure ranged from 250

PSIG at idle down to 175 PSIG while driving 55 MPH. Although the cooling performance of this example's refrigerant mixture was not as good as Example 3 refrigerant mixture, it was none the less "acceptable", and comparable to R-12, which was somewhat better than R-134a would have been.

EXAMPLE 6

25 pounds of R-227ea/125 75/25, a "drop-in" substitute refrigerant mixture for an R-134a automotive air conditioning system were created in the manner set forth above. 3.2 pounds of this mixture were charged into the air conditioning system of the vehicle in Example 3. Air conditioner controls were set at MAX fan (recirculate). Ambient temperature was 78 degrees Fahrenheit. Head pressure was 200 PSIG at idle, which dropped to 130 PSIG at 30 MPH driving speeds. This is too much of a drop for the head pressure, and could cause refrigerant starvation in the evaporator. At idle, not moving, the suction pressure was 40 PSIG, which dropped to 24 PSIG at 30 MPH driving, causing the low pressure cutout switch to open, causing the compressor to cycle off. The cold air duct temperature at this point was about 42 degrees Fahrenheit. Later in the day, the ambient temperature warmed up 85 degrees Fahrenheit. Head pressure at idle was still about 200 PSIG, and the 30 MPH driving head pressure rose to 150 PSIG. Duct temperature remained the same at 42 degrees Fahrenheit, but the higher head pressure caused more refrigerant to be admitted to the evaporator resulting in a faster cool down compared to 78 degree Fahrenheit temperatures earlier in the day.

EXAMPLE 7

R-600a/227ea/125 1/75/24, a "drop-in" substitute refrigerant mixture for an R-134a automotive air conditioning system, is created in the manner set forth above. The mixture of this Example shows good results in computer simulation with NIST program REFPROP V5.10. The glide calculates to be 17.5 degrees Fahrenheit (bubble point-dew point) at 70 degrees Fahrenheit ambient. The glide is a little bit too high. The R-600a component keeps waxes and tars dissolved, if present.

EXAMPLE 8

R-600a/227ea/125/134a 1/67/22/10, a "drop-in" substitute refrigerant mixture for an R-134a automotive air conditioning system, is created in the manner set forth above. The mixture of this Example shows good results in computer simulation with NIST program REFPROP V5. 10. The glide calculates to be 15.8 degrees Fahrenheit at 70 degrees Fahrenheit ambient, which is about right. R-134a is used to "dilute" the glide. Tars and waxes are dissolved by the R-600a component in the mixture.

EXAMPLE 9

R-245cb/125/290 58/41/1, a "drop-in" substitute refrigerant mixture for an R-134a automotive air conditioning system, is created in the manner set forth above. The mixture of this Example shows good results in computer simulation with NIST program REFPROP V5.10. The glide calculates to be 19.5 degrees Fahrenheit at 70 degrees Fahrenheit ambient, which is too high, but usable. Protection from plugging from tars and waxes is provided by the R-290 component.

EXAMPLE 10

R-245cb/125/290/134a 59/20/1/20, a "drop-in" substitute refrigerant mixture for an R-134a automotive air conditioning system, is created in the manner set forth above. The mixture of this Example shows good results in computer simulation with NIST program REFPROP V5. 10. The glide calculates to be 16 degrees Fahrenheit at 70 degrees Fahrenheit ambient, which is about right. R-134a is used to "dilute" the glide. Tars and waxes are dissolved by the R-290 component of the mixture.

EXAMPLE 11

R-134/143a/290 78/21/1 (note: R-134, not R-134a), a "drop-in" substitute refrigerant mixture for an R-134a automotive air conditioning system, is created in the manner set forth above. The mixture of this Example showed good results in computer simulation with NIST program REFPROP V5.10. The glide calculates to be 14 degrees Fahrenheit at 70 degrees Fahrenheit ambient, which is about right. Tars and waxes are dissolved by the R-290 component in the mixture. The critical temperature of this mixture is calculated to be around 240 degrees Fahrenheit, which is excellent.

EXAMPLES 12–24

Figure 2:
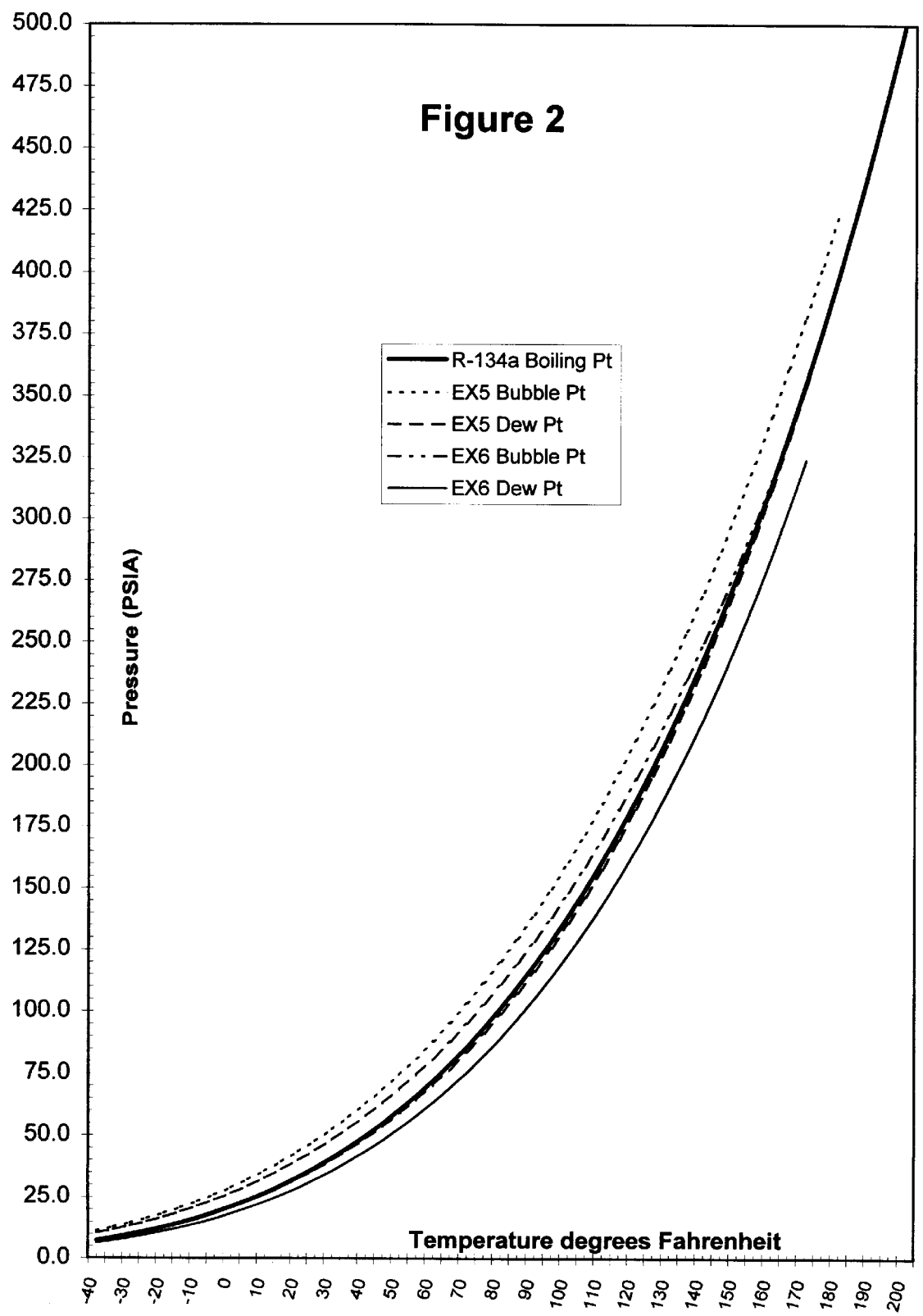
Figure 3:
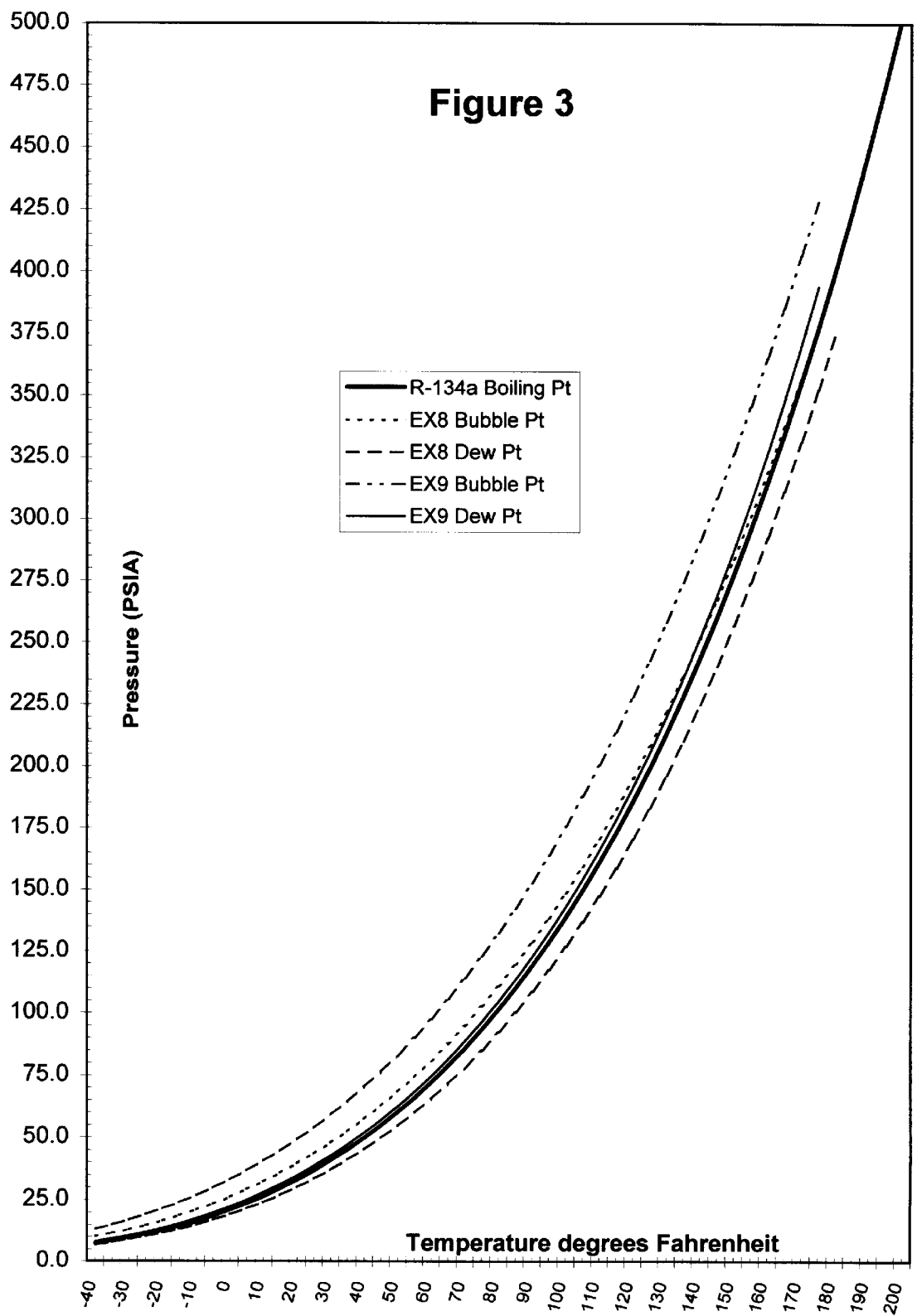
Figure 4:
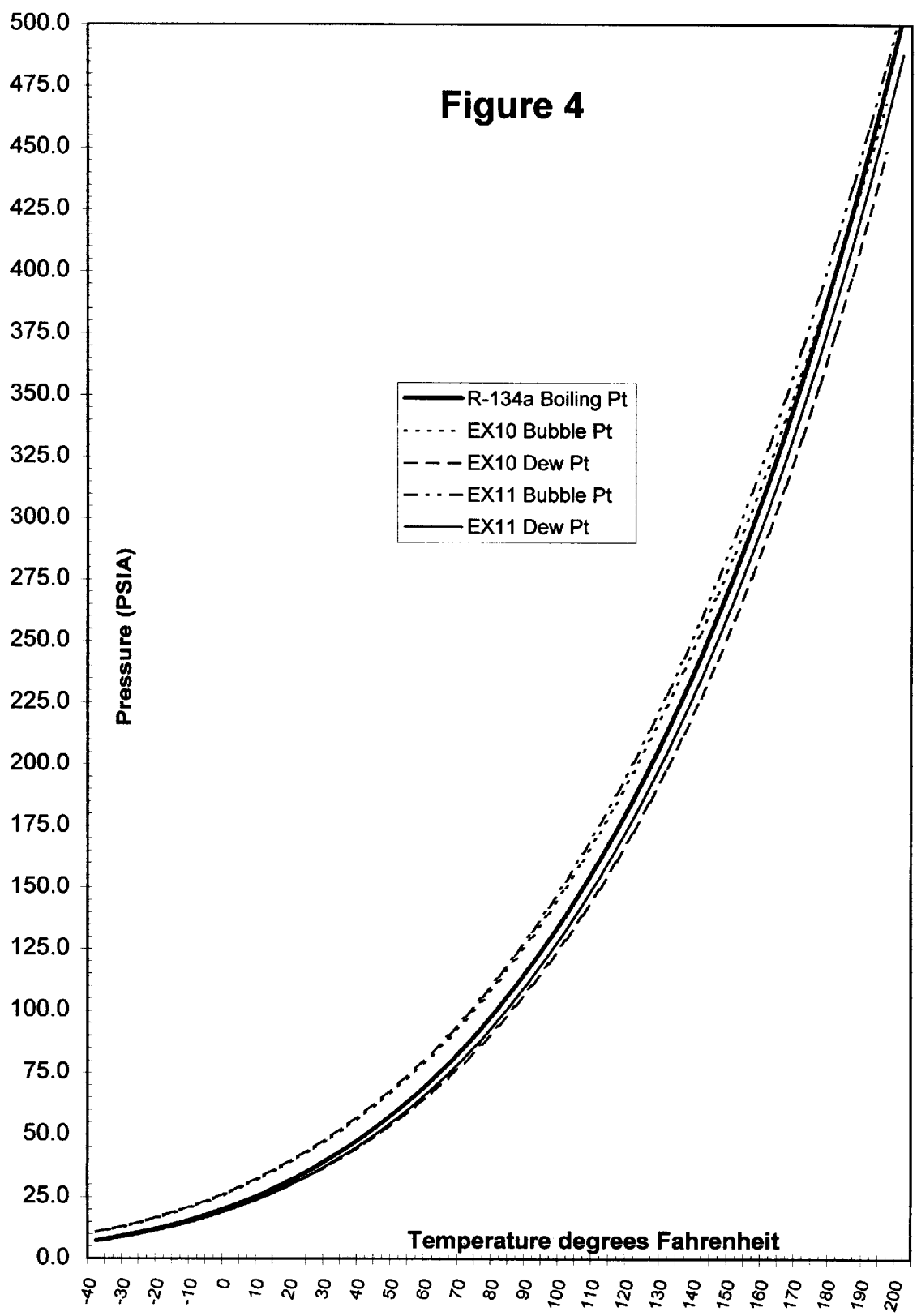
Figure 5:
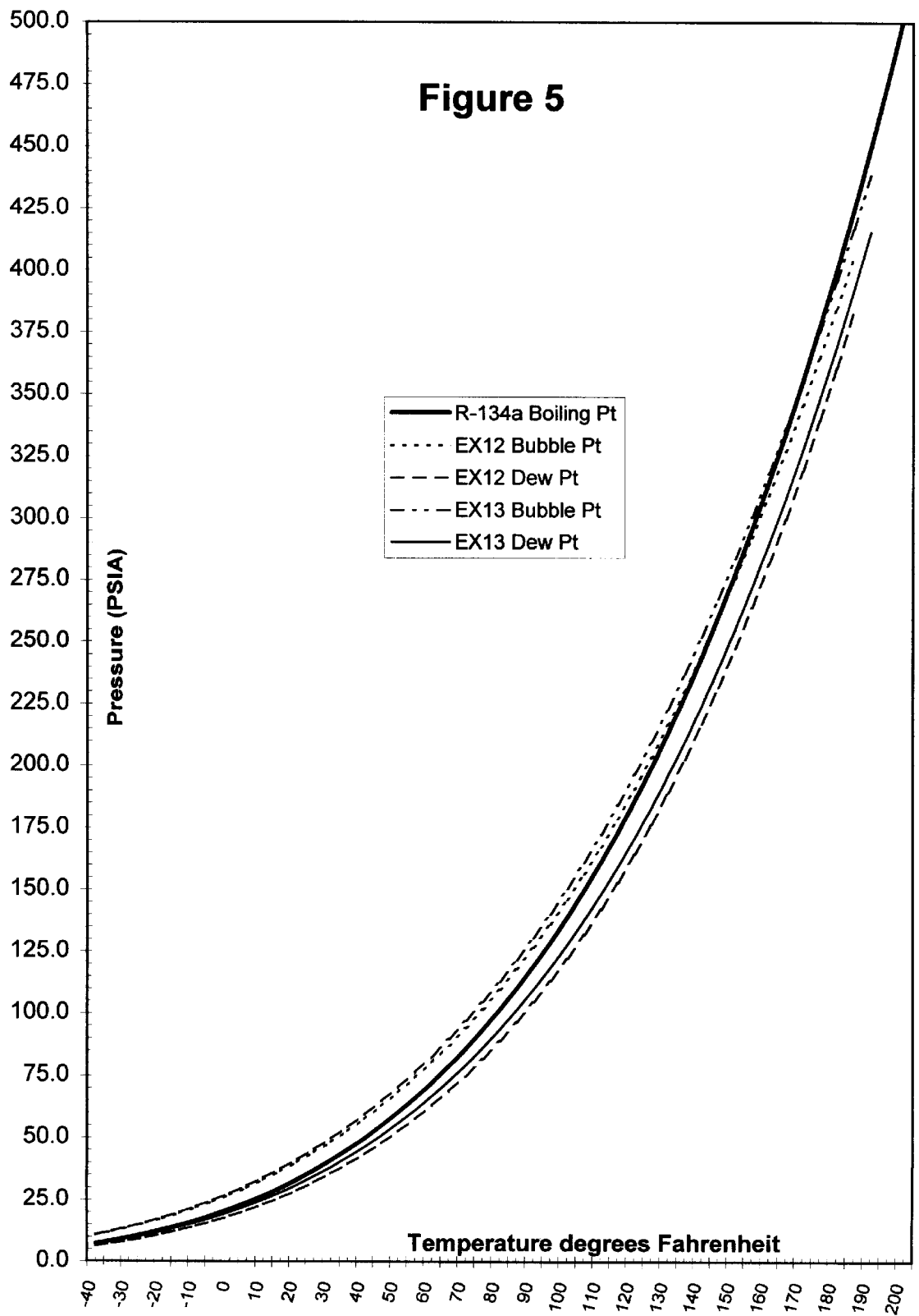
Figure 6:
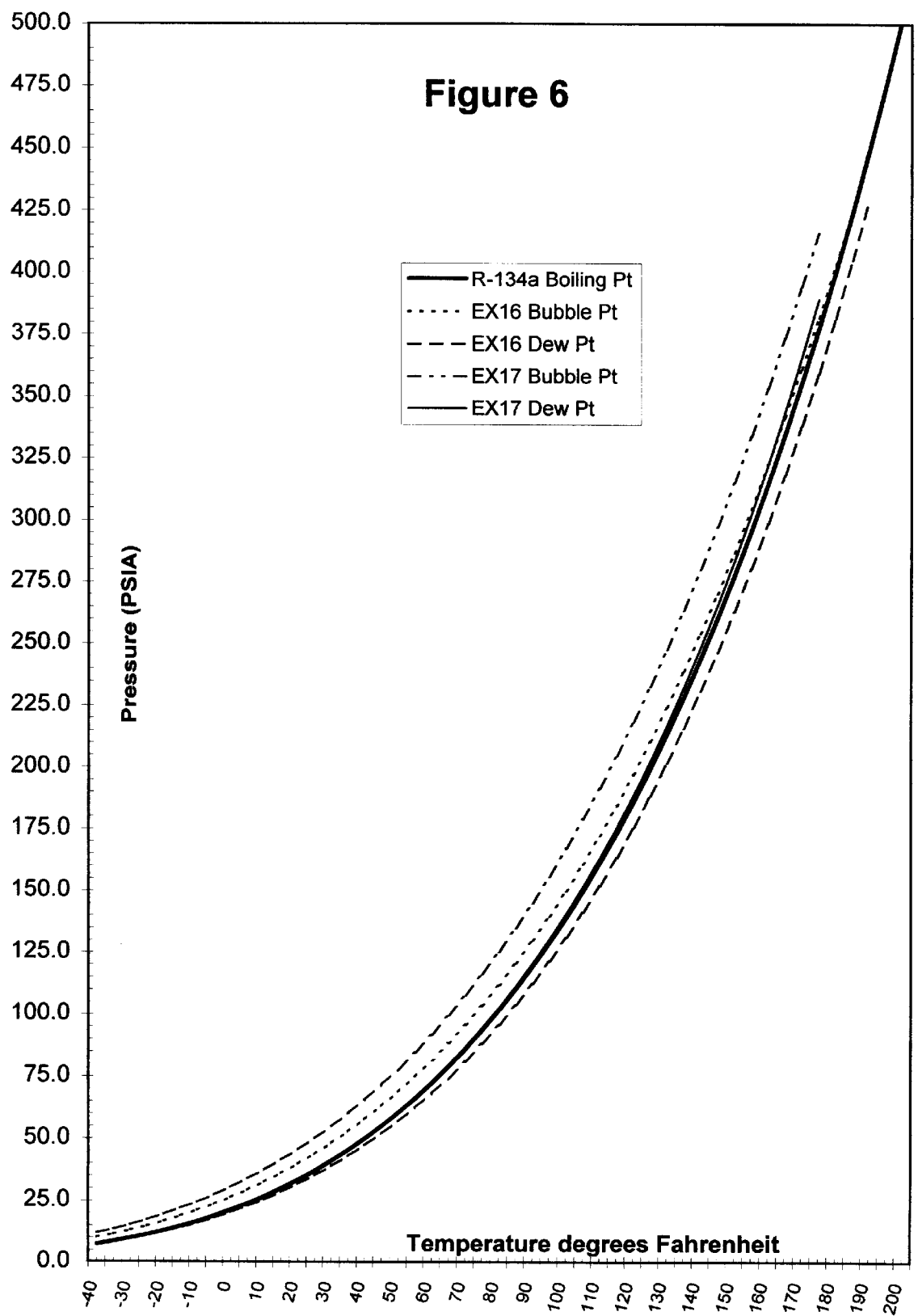
Figure 7:
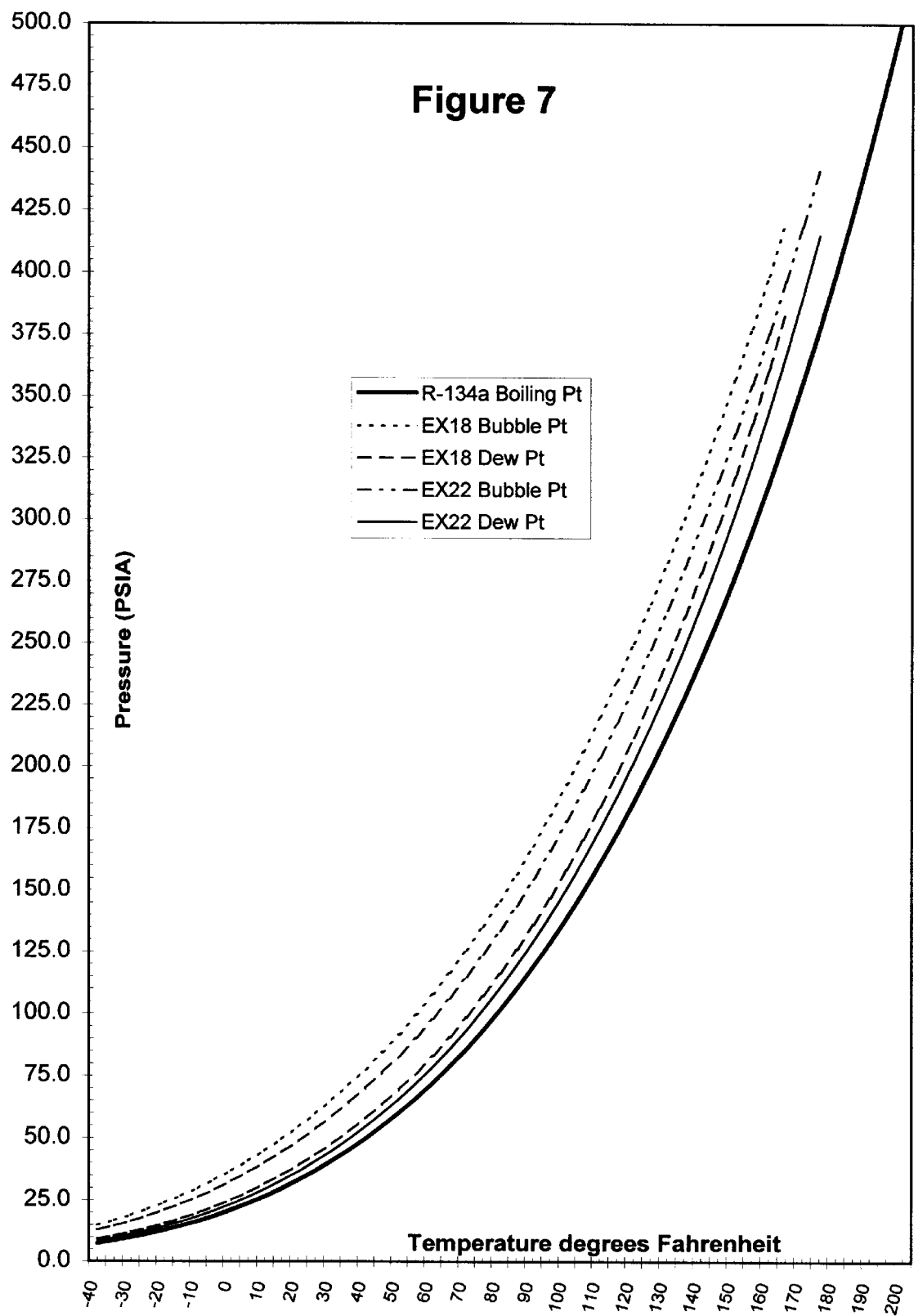
Figure 8:
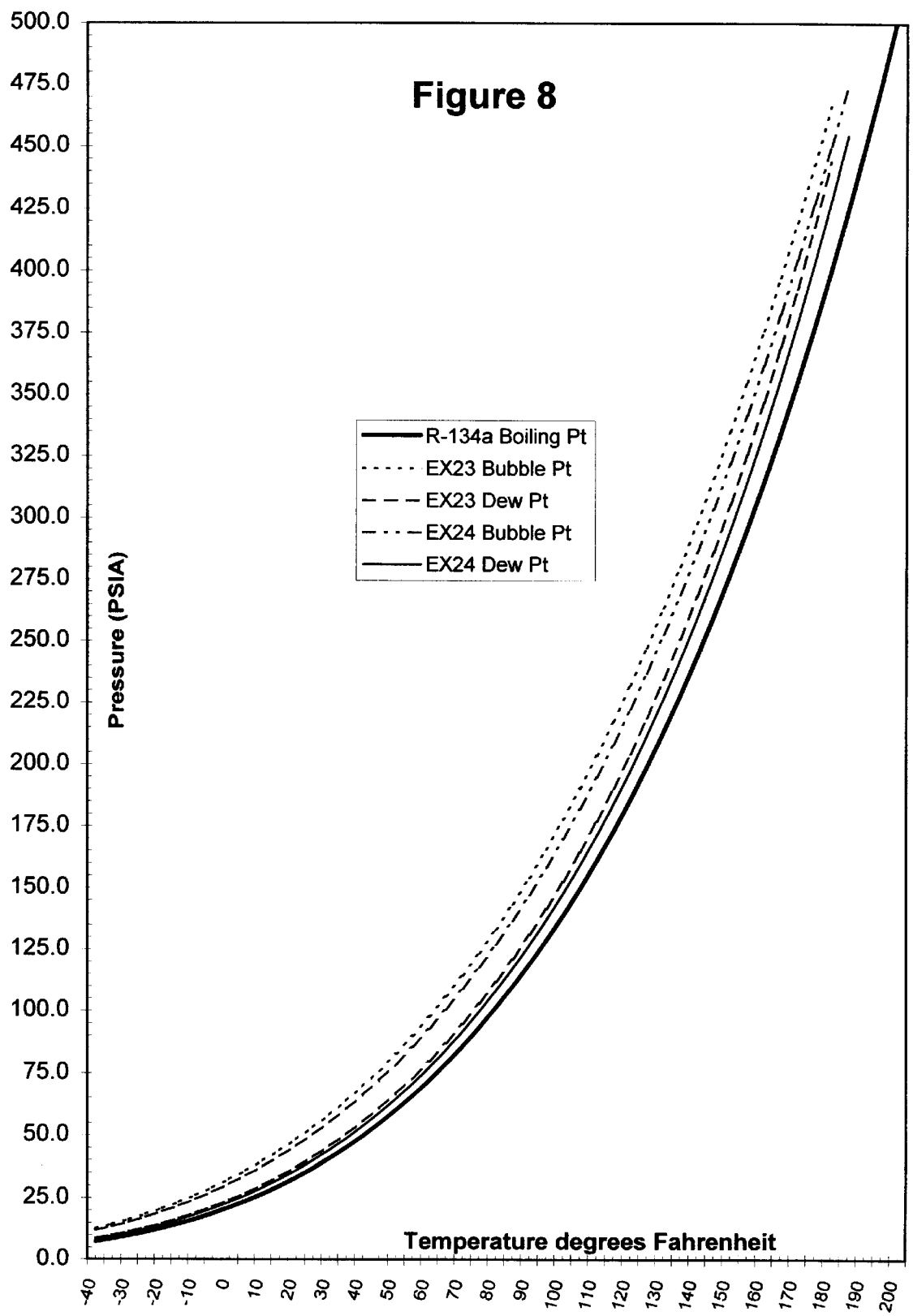

Most of the "drop-in" substitute refrigerant mixtures for R-134a of Examples 12–24, which are tabulated in Table 4, show good results in computer simulated with NIST program REFPROP V5.10. The refrigerant mixtures of Examples 1–15 are also included in Table 4 for completeness. General comment(s) are included for most entries in Table 4. The "Fig." column refers to which Figure of FIGS. 1–8 contains the temperature-pressure chart for the Example mixture. The "Crit" column refers to the estimated critical temperature calculated from computer program REFPROP V5.10.

TABLE 4

| Example | Components | Composition | Crit | FIG. | General comments (all glides at 70° F.) |
|---|---|---|---|---|---|
| 1 | R-227ea/152a/125 | 55/5/40 | 207 | 1 | |
| 2 | R-227ea/152a/125 | 60/5/35 | 210 | 1 | |
| 3 | Same as Example 1 | | | | |
| 4 | Same as Example 1 | | | | |
| 5 | R-227ea/152a/125 | 62/8/30 | 215 | 2 | |
| 6 | R-227ea/125 | 75/25 | 214 | 2 | |
| 7 | R-600a/227ea/125 | 1/75/24 | 214 | | glide a little high (17.5° F.) |
| 8 | R-600a/227ea/125/134a | 1/67/22/10 | 216 | 3 | good glide (15.8° F.) |
| 9 | R-245cb/125/290 | 58/41/1 | 210 | 3 | glide a little high (19.5° F.) |
| 10 | R-245cb/125/290/134a | 59/20/1/20 | 223 | 4 | good glide (16° F.) |
| 11 | R-134/143a/290 | 78/21/1 | 240 | 4 | good glide (14° F.), good crit temp |
| 12 | R-227ea/143a/290 | 82/17/1 | 215 | 5 | glide a little high (18.5° F.) |
| 13 | R-245cb/143a/600 | 73/26/1 | 221 | 5 | glide OK (17.1° F.) |
| 14 | R-245cb/E125/600 | 65/34/1 | | | |
| 15 | R-E143a/E125/600 | 90/9/1 | | | |
| 16 | R-227ea/152a/125/600 | 61/15/23/1 | 222 | 6 | glide a little low (13.4° F.) |

TABLE 4-continued

| Example | Components | Composition | Crit | FIG. | General comments (all glides at 70° F.) |
|---|---|---|---|---|---|
| 17 | R-600a/227ea/125/134a | 1/57/32/10 | 209 | 6 | High performance version of Ex8 |
| 18 | R-245cb/125/290 | 48/51/1 | 203 | 7 | High performance version of Ex9 |
| 19 | R-245cb/125 | 58/42 | 210 | | Ex9 without an oil miscibility improver |
| 20 | R-227ea/143a | 82/18 | 215 | | Ex12 without an oil miscibility improver |
| 21 | R-245cb/143a | 73/27 | 221 | | Ex13 without an oil miscibility improver |
| 22 | R-227ea/152a/125 | 50/10/40 | 210 | 7 | higher crit temp, lower glide than Ex1 |
| 23 | R-227ea/152a/125 | 45/15/40 | 213 | | higher crit temp, lower glide than Ex1 |
| 24 | R-227ea/152a/125 | 45/20/35 | 218 | | higher crit temp, lower glide than Ex1 |

There exist thousands of possible combinations and permutations from the refrigerant fluids listed in Table 1 that could produce a refrigerant substitute for R-134a. Many combinations can be ruled out under conditions 1,2, and 3 listed above. Other combinations may still provide a good refrigerant, but may not be currently environmentally acceptable, but they may become acceptable in the future as new evidence and understanding of the environment proceeds. Other combinations from Table 1 may produce R-134a "drop-in" substitutes that have low critical temperatures, below about 215 degrees Fahrenheit, and still provide satisfactory performance in the majority of climates, but prove unsatisfactory in extreme heat or very high humidity climates.

For any given combination of components from Table 1, above, that produce a useable "drop-in" substitute for R-134a, many permutations (ranges) of each component's weight percentage are possible. GROUP-C components (see discussion in Condition 1, above), may be varied over the range of about -10 to +15 weight percent from their "normal centerline" values used to create a normal temperature-pressure curve. This allows for special uses such as "low capacity" and "high capacity" refrigerant mixtures. Adjustment of weight percentages of GROUP-C components, must be accompanied by a corresponding opposite adjustment in GROUP-A components so that the total of all weight percentages remains at 100 percent

I claim:

1. A method for producing refrigeration in a refrigeration system designed for a 1,1,1,2-tetrafluoroethane refrigerant comprising the step of drop-in substituting for said 1,1,1,2-tetrafluoroethane a mixture of about 39–77 weight percent heptafluoropropane, about 2–25 weight percent 1,1-difluoroethane, and about 23–47 weight percent pentafluoroethane, with the weight percentages of said components being weight percentages of the overall mixture.

2. The method of claim 1 in which heptafluoropropane is present in about 55 weight percent, 1,1-difluoroethane is present in about 5 weight percent, and pentafluoroethane is present in about 40 weight percent.

3. The method of claim 1 in which heptafluoropropane is present in about 60 weight percent, 1,1-difluoroethane is present in about 5 weight percent, and pentafluoroethane is present in about 35 weight percent.

4. The method of claim 1 in which heptafluoropropane is present in about 62 weight percent, 1,1-difluoroethane is present in about 5 weight percent, and pentafluoroethane is present in about 30 weight percent.

5. The method of claim 1 in which heptafluoropropane is present in about 50 weight percent, 1,1-difluoroethane is present in about 10 weight percent, and pentafluoroethane is present in about 40 weight percent.

6. The method of claim 1 in which heptafluoropropane is present in about 45 weight percent, 1,1-difluoroethane is present in about 15 weight percent, and pentafluoroethane is present in about 40 weight percent.

7. The method of claim 1 in which heptafluoropropane is present in about 45 weight percent, 1,1-difluoroethane is present in about 20 weight percent, and pentafluoroethane is present in about 35 weight percent.

* * * * *

UNITED STATES PATENT AND TRADEMARK OFFICE
CERTIFICATE OF CORRECTION

PATENT NO : 5,954,995
DATED : September 21, 1999
INVENTOR(S) : George H. Goble

It is certified that error appears in the above-identified patent and that said Letters Patent are hereby corrected as shown below:

In column 5, line 19, please change "8F6" to --SF6--.

In column 10, line 45, please change "11 5" to --115--.

Signed and Sealed this

First Day of May, 2001

Attest:

NICHOLAS P. GODICI

Attesting Officer

Acting Director of the United States Patent and Trademark Office